(12) United States Patent
Bokich (10) Patent No.: US 9,186,821 B2
(45) Date of Patent: Nov. 17, 2015

(54) POSITIONING DEVICE FOR A MOLD (71) Applicant: Extreme Components LP, El Paso, TX (US)

(72) Inventor: Michael S. Bokich, El Paso, TX (US)

(73) Assignee: EXTREME COMPONENTS LP, El Paso, TX (US)

( * ) Notice: Subject to any disclaimer, the term of this patent is extended or adjusted under 35 U.S.C. 154(b) by 0 days.

(21) Appl. No.: 14/409,905

(22) PCT Filed: Oct. 30, 2013

(86) PCT No.: PCT/US2013/067529
§ 371 (c)(1),
(2) Date: Dec. 19, 2014

(87) PCT Pub. No.: WO2014/070907
PCT Pub. Date: May 8, 2014

(65) Prior Publication Data
US 2015/0147423 A1    May 28, 2015

Related U.S. Application Data (60) Provisional application No. 61/795,869, filed on Oct. 30, 2012.

(51) Int. Cl.
*B29C 45/28* (2006.01)
*B29C 33/22* (2006.01)
(Continued)

(52) U.S. Cl.
CPC ............... *B29C 33/22* (2013.01); *B29C 33/20* (2013.01); *B29C 45/2606* (2013.01); *B29C 2045/2604* (2013.01); *B29C 2045/4078* (2013.01); *B29L 2031/757* (2013.01)

(58) Field of Classification Search
CPC .. B29C 33/20; B29C 33/22; B29C 2045/2604
See application file for complete search history.

(56) References Cited

U.S. PATENT DOCUMENTS 2,577,412 A    12/1951    Ferrell
2,959,814 A    11/1960    Budd
(Continued)

FOREIGN PATENT DOCUMENTS

DE    3534937    *    4/1986
FR    1371348    *    9/1964
JP    2001-353728 A    12/2001

OTHER PUBLICATIONS

English language abstract and machine-assisted translation of the specification and claims for JP2001-353728 extracted from the Espace.net on Dec. 16, 2014, 27 pages.

*Primary Examiner* — Tim Heitbrink
(74) *Attorney, Agent, or Firm* — Howard & Howard Attorneys PLLC (57) ABSTRACT

A positioning device aligns first and second mold segments moving from an opened position to a closed position. The device includes a female member for connecting to one of the mold segments and for receiving a male member connected to the other of the mold segments. A bearing mechanism is coupled to the female member for receiving the male member and reducing friction between the male member and the female member. One of the female member and the bearing mechanism includes a post extending transversely to the alignment axis and the other of the female member and the bearing mechanism defines a groove receiving the post as the bearing mechanism moves relative to the female member. The engagement between the groove and the post retains the bearing mechanism in the female member when the first and second mold segments move between the opened and closed positions.

20 Claims, 9 Drawing Sheets

(51) Int. Cl.
   *B29C 33/20*   (2006.01)
   *B29C 45/26*   (2006.01)
   *B29C 45/40*   (2006.01)
   *B29L 31/00*   (2006.01)

(56) References Cited

U.S. PATENT DOCUMENTS

| | | |
|---|---|---|
| 3,706,116 A | 12/1972 | Drazick |
| 4,403,810 A | 9/1983 | Bieneck |
| 4,693,679 A | 9/1987 | Marth |
| 4,750,876 A | 6/1988 | Lawson |
| 4,828,478 A | 5/1989 | Hehl |
| 5,314,323 A | 5/1994 | Bolles |
| 5,490,317 A | 2/1996 | Kubert |
| 5,662,946 A | 9/1997 | Pratt et al. |
| 5,762,977 A | 6/1998 | Boskovic |
| 6,431,852 B1 | 8/2002 | Vandenberg |
| 6,491,512 B2 | 12/2002 | Vandenberg |
| 6,558,145 B2 | 5/2003 | Wieder |
| 6,921,256 B2 | 7/2005 | Bokich |
| 6,953,331 B2 | 10/2005 | Bokich |
| 7,229,265 B1 | 6/2007 | Lemkin |
| 7,300,271 B2 | 11/2007 | Parmenter et al. |
| 7,614,873 B1 * | 11/2009 | Morey .......................... 425/595 |
| 7,828,542 B2 | 11/2010 | Bokich |
| 7,862,326 B2 | 1/2011 | Wieder |
| 7,963,758 B2 | 6/2011 | Starkey |
| 7,963,759 B1 | 6/2011 | Morey |
| 2011/0280985 A1 | 11/2011 | Santos et al. |
| 2012/0177774 A1 | 7/2012 | Kaufman et al. |
| 2012/0294968 A1 | 11/2012 | Starkey et al. |
| 2014/0322376 A1 * | 10/2014 | Lin et al. ...................... 425/150 |

* cited by examiner

POSITIONING DEVICE FOR A MOLD

CROSS-REFERENCE TO RELATED APPLICATION

This U.S. application claims priority under 35 U.S.C 371 to, and is a U.S. National Phase application of, the International Patent Application No. PCT/US2013/067529, filed Oct. 30, 2013, which claims the benefit of U.S. Provisional Patent Application No. 61/795,869 filed Oct. 30, 2012. The entire contents of the above-mentioned patent applications are incorporated by reference as part of the disclosure of this U.S. application.

BACKGROUND OF THE INVENTION

1. Field of the Invention

The present invention relates to a positioning device for aligning first and second mold segments as the mold segments move from an opened position to a closed position.

2. Description of the Related Art

In a typical molding process, e.g., a mold cavity and core, are closed together to define a cavity therebetween and material is injected into the cavity to form a part. During the molding process, the mold cavity and core are repeatedly opened and closed to form multiple parts. Molding processes are used in many industries. In several of these industries, the products being formed must meet rigorous standards and specifications. Hence, the tolerance for misalignment between the first and second segments during the molding process is generally small.

In addition to the mold cavity and core, the mold can also include an intermediate segment that moves relative to the mold cavity and core when the mold is opened and closed. This intermediate segment is configured to engage the part to strip the part from the cavity. In industry, the intermediate segment can be referred to as a stripper plate or a floating plate.

Positioning devices are used to reduce tolerances between the mold cavity and core to form products that meet the appropriate standards and specifications for each industry. The positioning device can include a first member attached to the mold cavity and a second member attached to the mold core. The mold cavity and core are typically spaced from each other when the molds are open and come together to engage each other and align the mold cavity and core as the mold cavity and core close together. Specifically, one of the first and second members can be a male member and the other of the first and second members can be a female member that receives the male member. In a design where the mold includes the intermediate segment, the positioning device can include a third member disposed between the first and second members for engaging the first and second members as the first segment, second segment, and intermediate segment of the mold close together.

The fit between the male member and female member determines the magnitude of potential misalignment between the mold segments. The male and female members typically include bearing surfaces that slide against each other as the first, second, and third members come together as the mold cavity and core close. As a result, these bearing surfaces are susceptible to wear. For example, the mold is typically arranged horizontally such that the segments move relative to each other along a horizontal axis as the mold is opened and closed. Over repeated cycles, gravity can misalign the members of the positioning device thereby increasing the wear of these members. Consequently, as demand for higher productivity increases, the speed of the molding process increases thereby increasing the wear along the bearing surfaces of the positioning device.

Traditionally, when the bearing surfaces became worn, the positioning devices must be replaced in order to maintain proper tolerances. This results in increased cost and unacceptable delays in production. There remains opportunity to improve the positioning device in order to properly align the segments of the mold while also extending the life of the positioning device.

SUMMARY OF THE INVENTION AND ADVANTAGES

The present invention includes a positioning device for aligning first and second mold segments as the first and second mold segments move from an opened to a closed position. The positioning device comprises a female member for connecting to one of the first and second mold segments and for receiving a male member connected to the other of the first and second mold segments. A bearing mechanism is coupled to the female member and is configured to move relative to the female member along an alignment axis for receiving the male member and reducing friction between the male member and the female member. One of the female member and the bearing mechanism includes a post extending transversely to the alignment axis and the other of the female member and the bearing mechanism defines a groove receiving the post as the bearing mechanism moves relative to the female member. The groove extends in parallel with the alignment axis and extends between and terminates at first and second ends spaced along the alignment axis for retaining the post between the first and second ends to retain the bearing mechanism in the female member when the first and second mold segments move between the opened and closed positions.

The bearing member reduces friction between the female member and the male member. This reduction in friction advantageously reduces wear on the positioning device and thus extends the life of the positioning device. As a result, this extended life of the positioning device advantageously reduces mold down-time associated with repair and/or replacement of the positioning device.

The interaction between the post and the groove ensures proper alignment of the bearing mechanism relative to the female member as the first and second mold segments move between the opened and closed positions. Specifically, as the first and second mold segments move to the closed position, the male member moves the bearing mechanism such that the first end of the groove and the post move toward each other. Before, or as, the first and second mold segments reach the closed position, the post and the first end retain the bearing mechanism in a proper position for the next mold operation, i.e., movement of the first and second segments toward the opened position.

As the first and second mold segments move toward the opened position, the male member moves the bearing mechanism such that the second end of the groove and the post move toward each other. The post and the second end prevent the bearing mechanism from being completely removed from the female member. Before, or as, the first and second mold segments reach the opened position, the post and the second end retain the bearing mechanism in a proper position for the next mold operation, i.e., movement of the first and second mold segments toward the closed position. Such a design is capable of being operated without a spring for returning the bearing mechanism to a proper position as the first and second mold segments move between the opened and closed positions.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like parts throughout the several views, a positioning device 10, 110, 120 for a mold 12 is generally shown. The mold 12 includes at least a first mold segment 14 and a second mold segment 16 moveable relative to each other between an opened position, e.g., shown in FIGS. 2, 10, 12, and 14, and a closed position, e.g., shown in FIGS. 1, 4, 6, 11, 13, and 15. The positioning device 10, 110, 120 aligns the first and second mold segments 14, 16 as the first and second mold segments 14, 16 move from the opened position to the closed position. As set forth further below, a first embodiment of the positioning device 10 is shown in FIGS. 1-3 and 10-11; a second embodiment of the positioning device 110 is shown in FIGS. 4-5 and 12-13; and a third embodiment of the positioning device 210 is shown in FIGS. 6-7 and 14-15. Common numerals are used to identify common features in the various embodiments.

Figure 1:
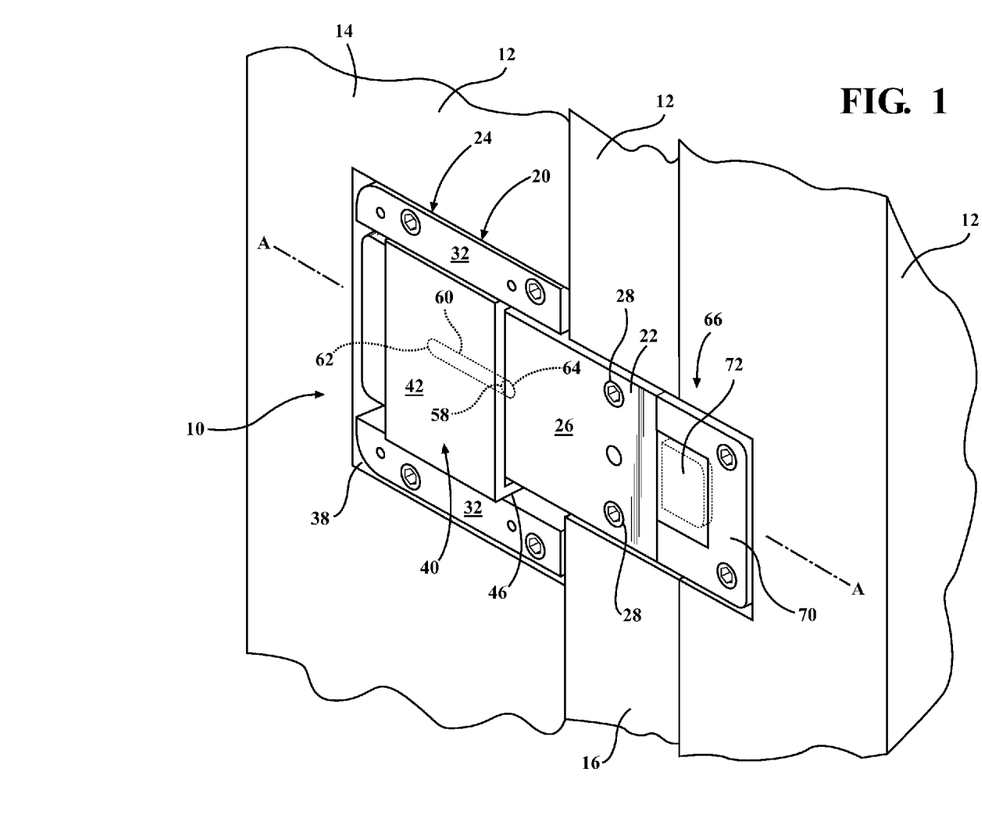
FIG. 1 is a perspective view of a positioning device engaged with a mold in a closed position.
Figures 2, 3:
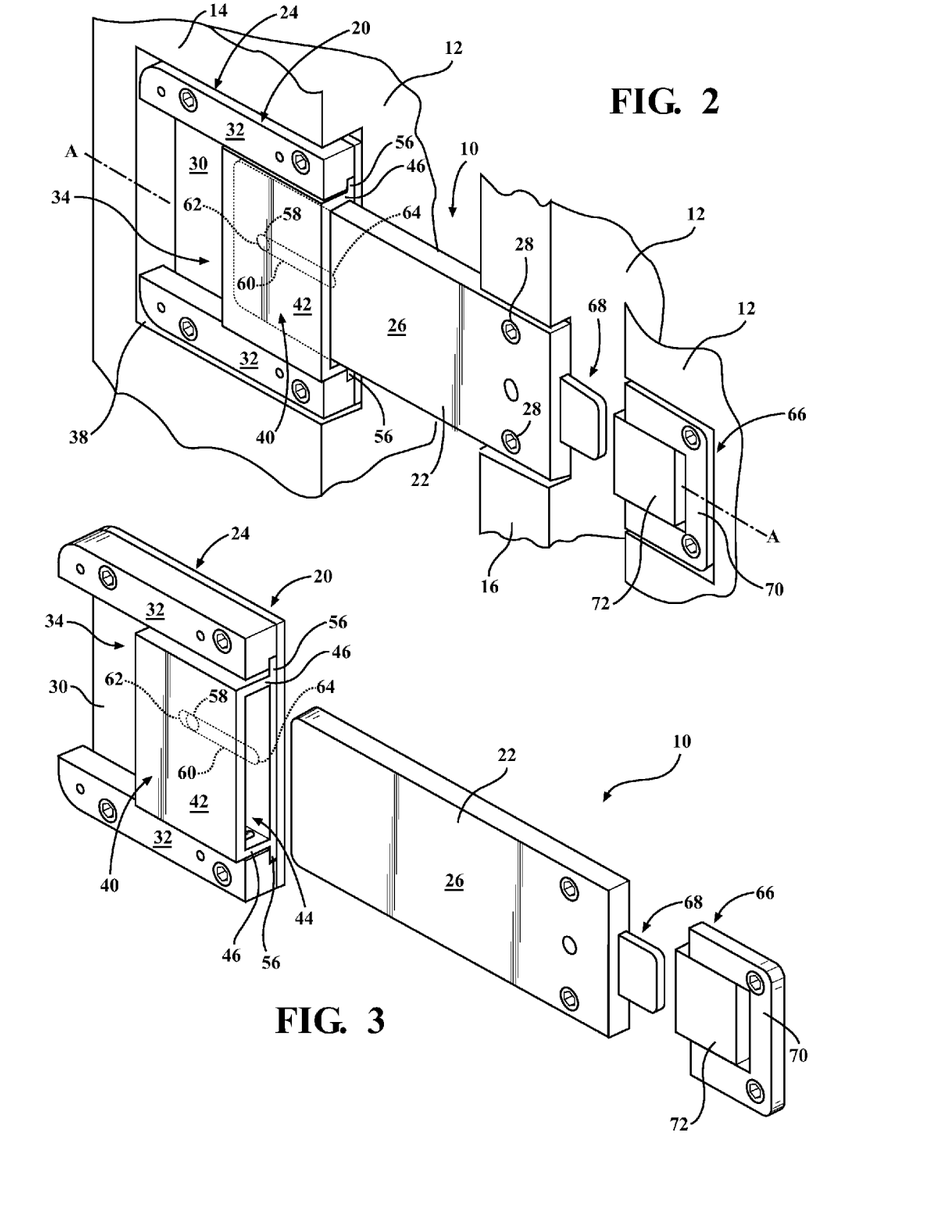
FIG. 2 is a perspective view of the positioning device of FIG. 1 with the mold in the opened position.
FIG. 3 is an exploded view of the positioning device of FIG. 1.
Figure 6:
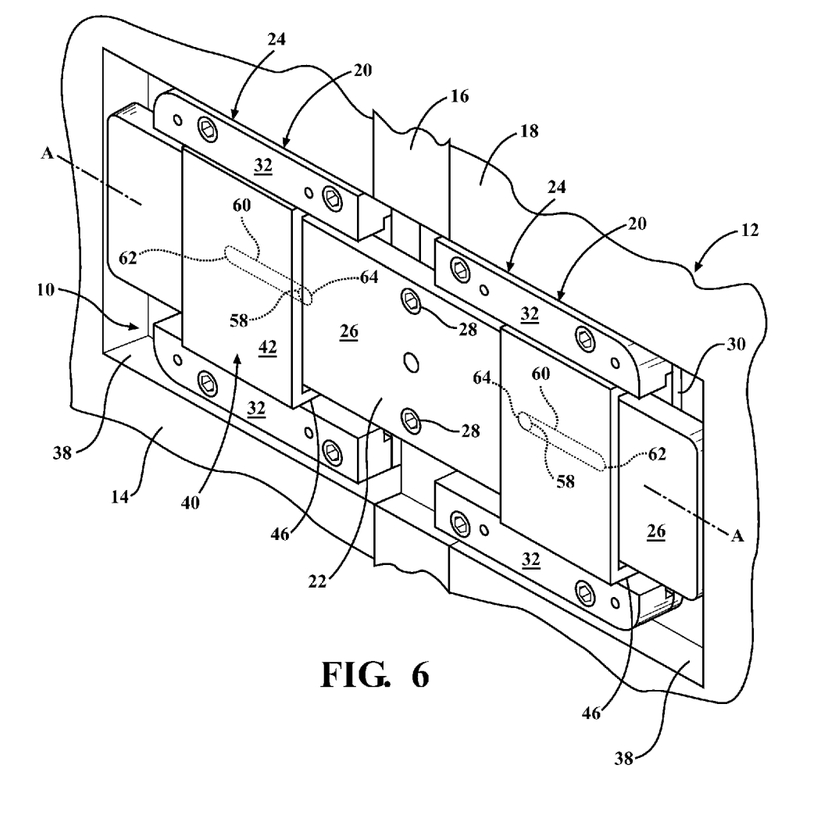
FIG. 6 is a perspective view of another embodiment of the positioning device engaged with a mold in a closed position.
Figure 7:
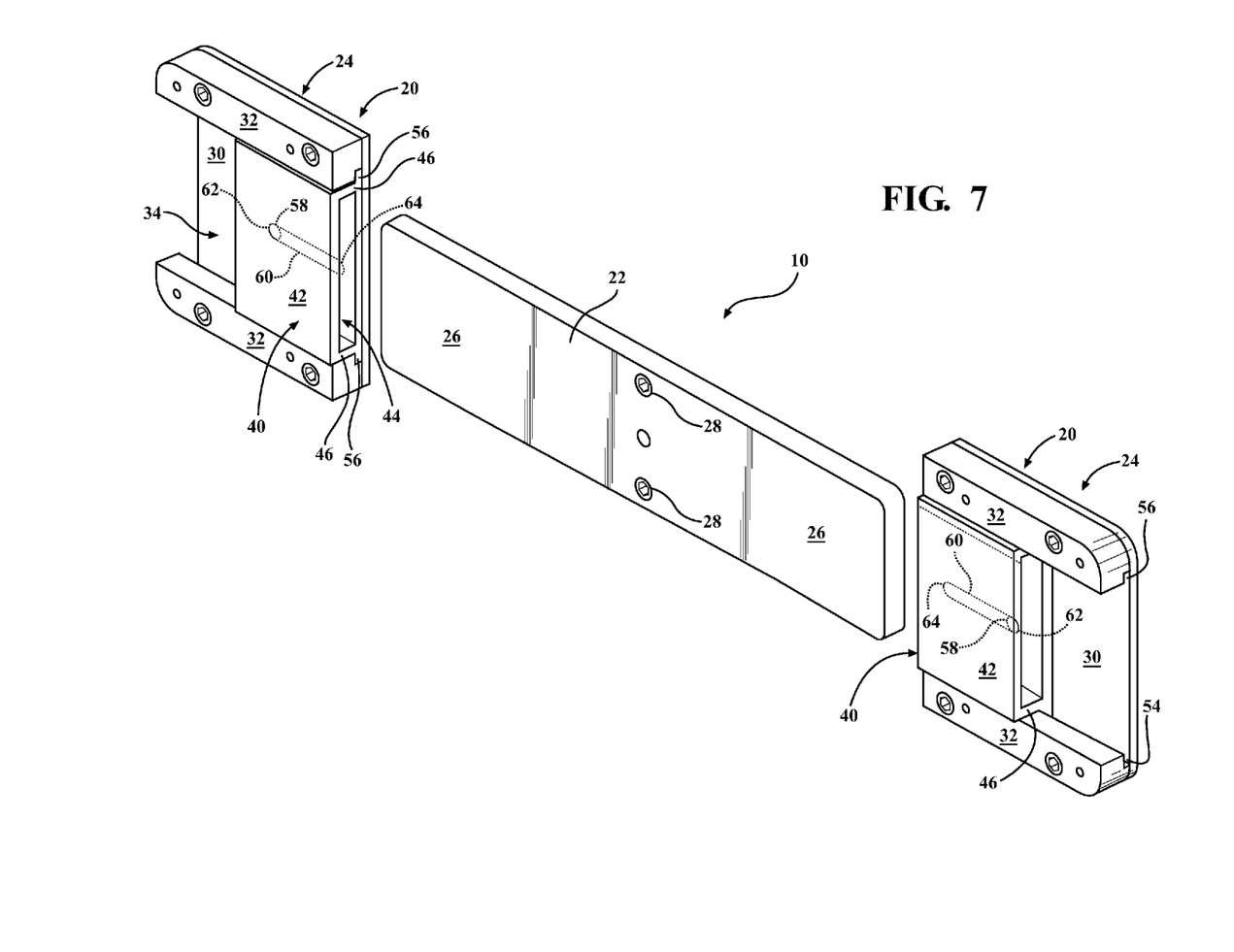
FIG. 7 is an exploded view of the positioning device of FIG. 6.

With reference to FIGS. 1, 2 and 6, the mold 12 can be of the type referred to in industry as a three-piece mold. In such a configuration, the first mold segment 14 and a third mold segment 18 can be a mold cavity and a mold core. Either of the first or third mold segments 14, 18 can be the mold cavity and the other the mold core. When the first and third mold segments 14, 18 are moved to the closed position, the first and third mold segments 14, 18 define a cavity (not shown) therebetween and material is injected into the cavity to form a part (not shown). In other words, the first and third mold segments 14, 18 move to the closed position for forming the part between the first and third mold segments 14, 18. As shown in FIG. 2, the first and third mold segments 14, 18 move to the opened position for removing the part from between the first and third mold segments 14, 18.

Specifically, as the first and third mold segments 14, 18 move relative to each other from the closed position toward the opened position, the second mold segment 16 moves relative to both the first and third mold segments 14, 18. When the first mold segment 14 is moved away from the second and third mold segments 16, 18 toward the opened position, the part remains engaged with the third mold segment 18 and the second mold segment 16 moves relative to the third mold segment 18 to remove the part from the third mold segment 18. The second mold segment 16 is positioned to and configured to engage the part and move the part relative to the third mold segment 18 as the second mold segment 16 moves relative to the first mold segment 14. In such a configuration, the second mold segment 16 can be referred to in industry as a stripper plate because the second mold segment 16 strips the formed part from the first and/or third mold segments 18 as the mold 12 is moved to the opened position. The second mold segment 16 can also be referred to in industry as a floating plate. Typically, the mold 12 is oriented in a horizontal configuration, i.e., the first mold segment 14, the second mold segment 16, and the third mold segment 18 move relative to each other in a generally horizontal direction. As such, the formed part falls under the force of gravity when the second mold segment 16 removes the formed part from the first and/or third mold segments 14, 18.

Figure 4:
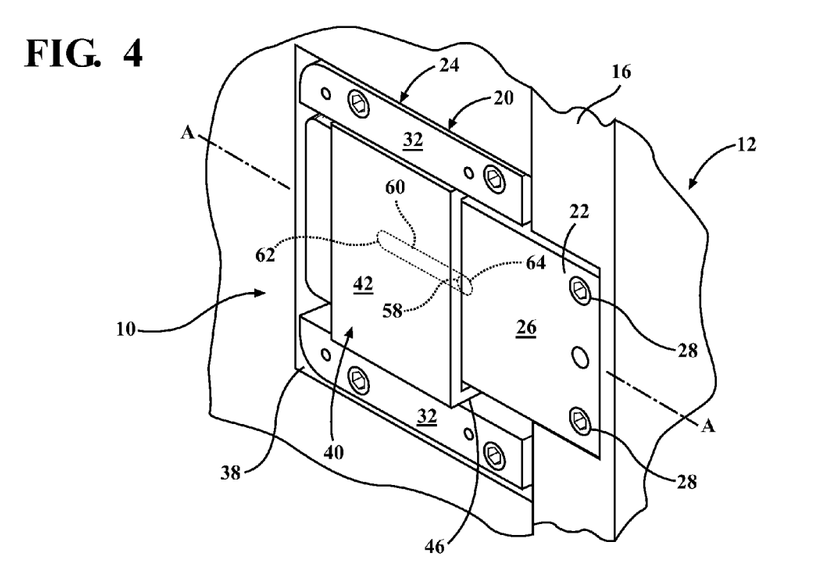
FIG. 4 is a perspective view of another embodiment of the positioning device engaged with a mold in a closed position.
Figure 5:
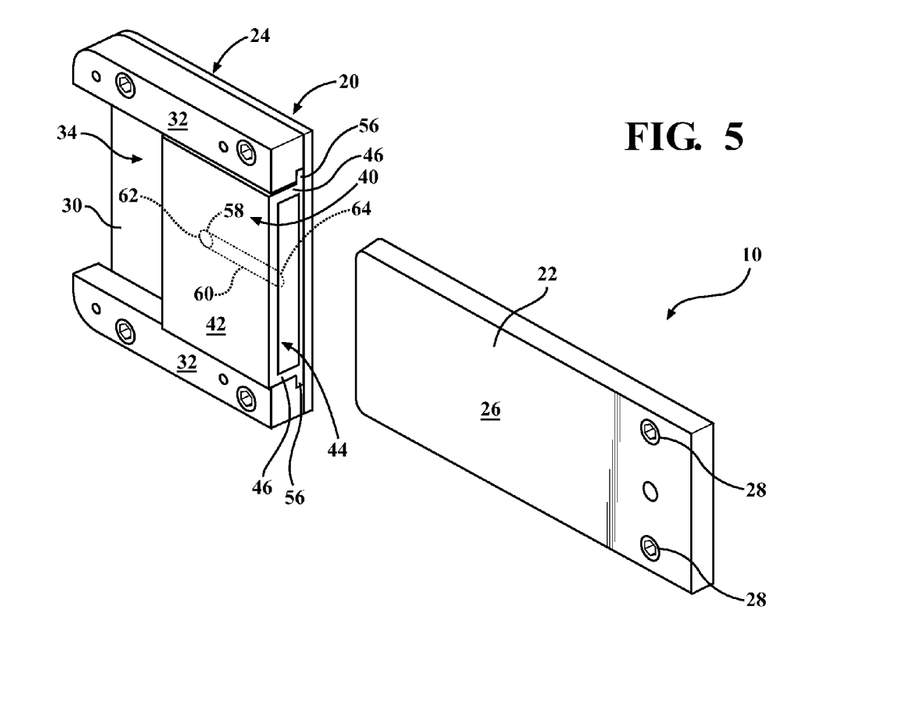
FIG. 5 is an exploded view of the positioning device of FIG. 4.

Alternatively, with reference to FIG. 4, the first and second mold segments 14, 16 can be the mold cavity and the mold core, i.e., forming a cavity therebetween for injection of material and formation of the part. Either of the first or second mold segments 14, 16 can be the mold cavity and the other can be the mold core. When the first and second mold segments 14, 16 are moved to the closed position, the first and second mold segments 14, 16 define a cavity (not shown) therebetween and material is injected into the cavity to form a part. While FIGS. 1 and 2 show the mold 12 with three mold segments and FIG. 4 shows the mold 12 with two mold segments, it should be appreciated that the mold 12 can include any number of mold segments without departing from the nature of the present invention and the embodiments of the positioning device 10, 110, 210 can be used with a mold 12 having any suitable number of mold segments.

The mold 12 can be, for example, a plastic injection mold, such that the material injected into the cavity is plastic. Alternatively, the mold 12 can be any type of mold without departing from the nature of the present invention, such as, for example stamping of metal or other material, pressure molding, pressing, hot forming, etc.

With reference to FIGS. 1-7, the positioning device 10 includes a first member 20 for connecting to one of the first and second mold segment 14, 16 and a second member 22 for connecting to the other of the first and second mold segment 14, 16. The first member 20 and the second member 22 are configured to mate with each other and move relative to each other along an alignment axis A as the first and second mold segment 14, 16 move from the opened position to the closed position.

One of the first and second members 20, 22 includes a female portion, i.e., is a female member 24. The other of the first and second member 20, 22 includes a male portion, i.e., is a male member 26, received by the female member 24. Said differently, the female member 24 connects to one of the first and second mold segment 14, 16 for receiving the male member 26, which is connected to the other of the first and second mold segment 14, 16. In the embodiments shown in FIGS. 1-7, for example, the female member 24 is connected to the first mold segment 14 and the male member 26 is connected to the second mold segment 16, either of which can be a mold cavity, a mold core, or another mold segment without departing from the nature of the present invention.

The male member 26 is typically formed of hardened tool steel, for example. The male member 26 includes mounting features for being mounted to one of the mold segments 14, 16. For example, the male member 26 defines holes 28 for receiving threaded fasteners (not numbered), e.g., bolts, that threadedly engage the second mold segment 16. However, it should be appreciated that the male member 26 can be mounted to one of the mold segments 14, 16 in any fashion without departing from the nature of the present invention.

Figure 8:
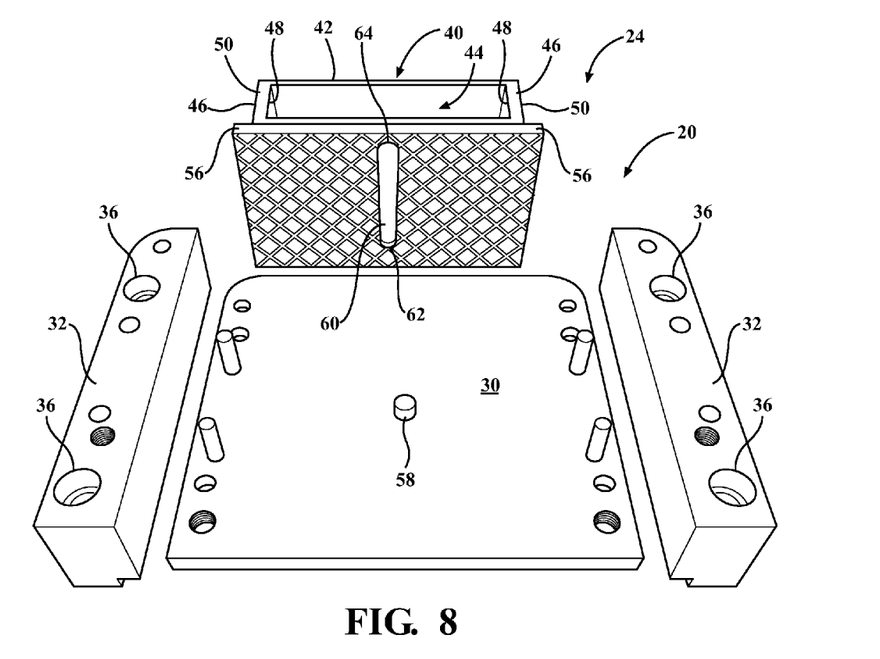
FIG. 8 is a side view of a female member and a bearing mechanism of the positioning device of FIGS. 1, 4, and 6.
Figure 9:
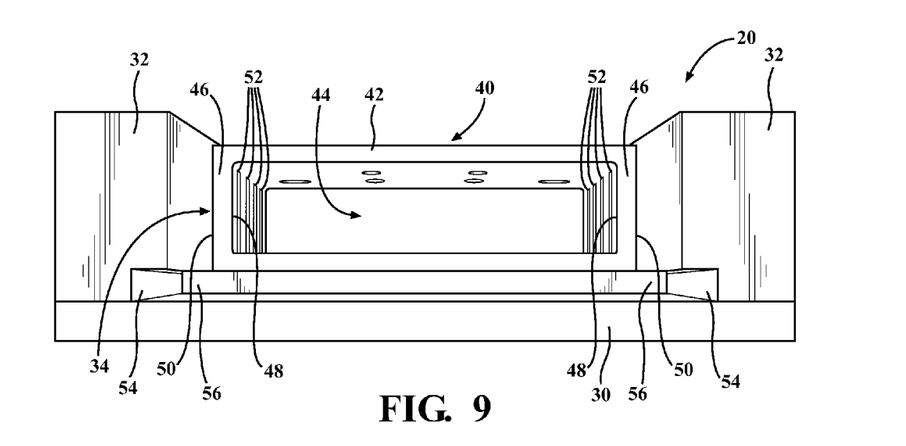
FIG. 9 is an exploded view of the female member and the bearing mechanism.

As best shown in FIGS. 8 and 9, the female member 24 includes a back 30 and a pair of sides 32 spaced from each other and extending from the back 30 defining a channel 34 therebetween. The channel 34 extends along the alignment axis A. The back 30 is typically formed of copper, for example. The sides 32 are typically formed of hardened tool steel, for example.

The female member 24 includes mounting features for being mounted to the first mold segment 14. Typically, the sides 32 and the back 30 define aligned holes 36 for receiving threaded fasteners (not numbered), e.g., bolts, that threadedly engage the first mold segment 14. The first mold segment 14 typically defines a pocket 38 for receiving the female member 24. However, it should be appreciated that the female member 24 can be mounted to the first mold segment 14 in any fashion without departing from the nature of the present invention. A cover (not shown) can cover the pocket 38 to prevent entry of dirt, debris, etc. into the pocket 38. The cover, for example, can be formed of plastic and can be mounted to the sides 32 to cover the channel 34.

A bearing mechanism 40 is coupled to the first member 20 for reducing friction between the first member 20 and the second member 22 when the first member 20 and the second member 22 move relative to each other. In the embodiments shown in the Figures, the bearing mechanism 40 is coupled to the female member 24 and is configured to move relative to the female member 24 along the alignment axis A for receiving the male member 26 and reducing friction between the male member 26 and the female member 24. Alternatively, the bearing mechanism 40 is coupled to the male member 26 and is configured to move relative to the male member 26 along the alignment axis A for engaging the female member 24 and reducing friction between the female member 24 and the male member 26.

The female member 24 moveably receives the bearing mechanism 40 in the channel 34 and the bearing mechanism 40 is moveable relative to the female member 24 along the alignment axis A. The male member 26 is configured, e.g., sized and shaped, to engage the bearing mechanism 40.

The bearing mechanism 40 includes a cage 42 and a plurality of bearings 52 supported by the cage 42. The cage 42 defines a cavity 44 extending along the alignment axis A. Specifically, the cage 42 includes walls 46 that include an interior surface 48 adjacent the male member 26 when the male member 26 is in the cavity 44 and an exterior surface 50 adjacent one of the sides 32 when the cage 42 is in the channel 34. The cage 42 is typically formed of hardened tool steel, for example.

The cage 42 rotatably supports the bearings 52 and the bearings 52 extend into the cavity for slideably contacting the male member 26 and for slideably contacting the sides 32. Specifically, the walls 46 of the cage 42 support the bearings 52. The bearings 52 each protrude from the interior surface 48 of the wall 46 into the cavity 44 and protrude from the exterior surface 50 of the wall 46. Each bearing 52 contacts both the male member 26 in the cavity 44 adjacent the interior surface 48 and one of the sides 32 adjacent the exterior surface 50. It should be appreciated that the cage 42 can support any number of bearings 52 on any number of sides of the cage 42 without departing from the nature of the present invention. The bearings 52 are typically needle bearings, but can be any type of bearing without departing from the nature of the present invention.

As best shown in FIGS. 8 and 9, one of the first member 20, e.g., the female member 24, and the cage 42 of the bearing mechanism 40 defines a slot 54 extending from the channel 34 and the other of the first member 20 and the cage 42 presents a wing 56 that engages the slot 54. The slot 54 and the wing 56 extend longitudinally along the alignment axis A to allow the cage 42 to move along the alignment axis A relative to the first member 20. The Figures show the female member 24 defining two slots 54 and the cage 42 defining two wings 56, however, it should be appreciated that, alternatively, the slots 54 or wings 56 can be on either the cage 42 or the first member 20, e.g., the female member 24, and the cage 42 and the first member 20 can have any number of corresponding slots 54 and wings 56.

One of the first member 20 and the bearing mechanism 40 includes a post 58 and the other of the first member 20 and the bearing mechanism 40 defines a groove 60 receiving the post 58 as the bearing mechanism 40 moves relative to the first member 20. For example, as shown in FIG. 9, the first member 20 includes the post 58 and the bearing mechanism 40 defines the groove 60.

In the instance where the first member 20 is the female member 24, as shown in the Figures, one of the female member 24 and the bearing mechanism 40 includes the post 58 and the other of the female member 24 and the bearing mechanism 40 defines the groove 60. For example, in the configuration shown in the Figures, the female member 24 defines the post 58 and the bearing mechanism 40 defines the groove 60. Alternatively, as set forth above, the first member 20 can be the male member 26, in which case, one of the male member 26 and the bearing mechanism 40 includes the post 58 and the other of the male member 26 and the bearing mechanism 40 defines the groove 60.

The post 58 extends transversely to the alignment axis A, i.e., extends at a non-zero angle relative to the alignment axis A. Although the post 58 intersects the alignment axis A in the Figures, the post 58 can extend transversely to the alignment axis A without intersecting the alignment axis A, e.g., the post 58 can be offset from the alignment axis A and extend at a non-zero angle relative to the alignment axis A.

The groove 60 extends between and terminates at first and second ends 62, 64 for retaining the post 58 between the first and second ends 62, 64 to retain the bearing mechanism 40 in the first member 20 when the first and second mold segments 14, 16 move between the opened and closed positions. For example, in the configuration where the first member 20 is the female member 24, as shown in the Figures, the first and second ends 62, 64 of the groove 60 retain the bearing mechanism 40 in the channel 34 of the female member 24 when the first and second mold segments 14, 16 move between the opened and closed positions.

The groove 60 extends in parallel with the alignment axis A. It should be appreciated that the groove 60 can be parallel with alignment axis A while either on the alignment axis A or being offset from the alignment axis A. The groove 60 extends longitudinally along, i.e., on or offset from, the alignment axis A so that the cage 42 can move along the alignment axis A relative to the first member 20, e.g., the female member 24 as shown in the Figures. It should be appreciated that the groove can extend longitudinally along the alignment axis while either on the alignment axis A or being offset from the alignment axis A.

The post 58 rides in the groove 60 as the cage 42 moves relative to the first member 20, e.g., the female member 24 as shown in the Figures. The first end 62 and the second end 64 are spaced from each other along the alignment axis A, i.e., on or offset from the alignment axis A, for limiting movement of the post 58 relative to the groove 60 and thus limiting relative movement of the cage 42 and the first member 20, e.g., the female member 24, along the alignment axis A.

Figure 10:
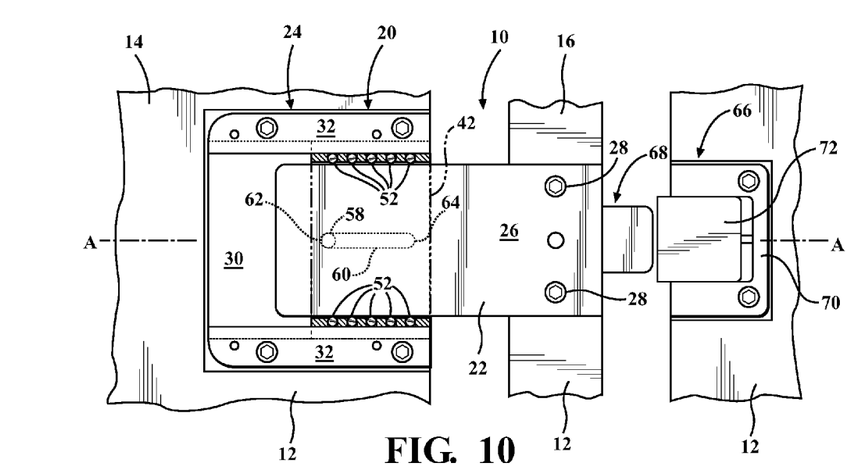
FIG. 10 is a side view of the positioning device and mold of FIG. 1 with the mold in the opened position.
Figure 11:
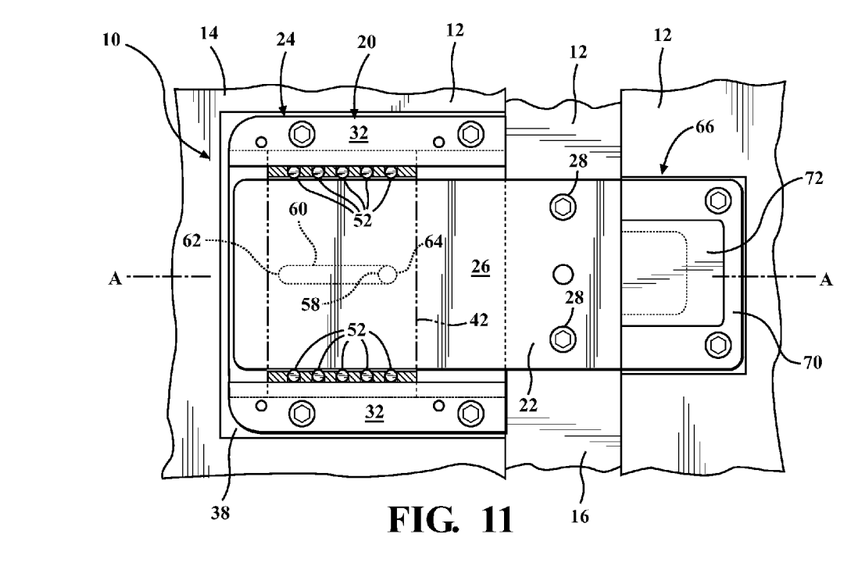
FIG. 11 is a side view of the positioning device and mold of FIG. 1 with the mold in a closed position.
Figure 12:
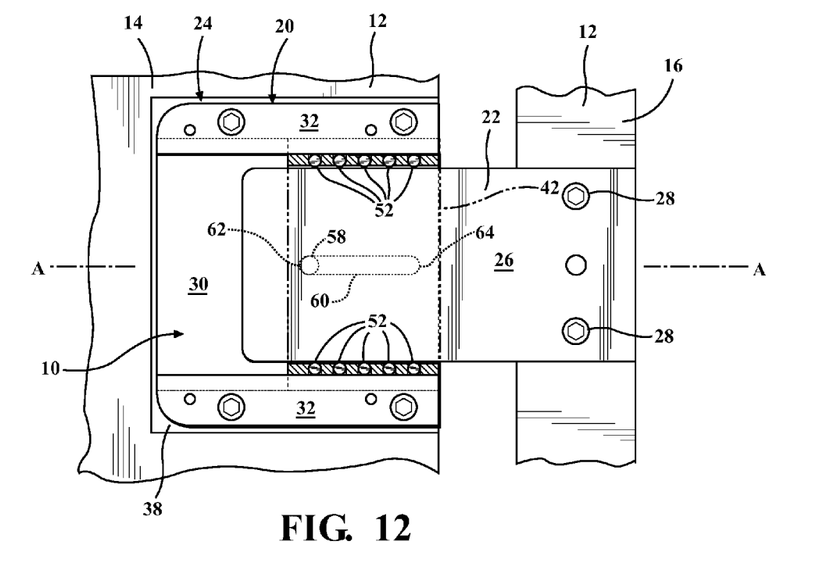
FIG. 12 is a side view of the positioning device and mold of FIG. 4 with the mold in the opened position.
Figure 13:
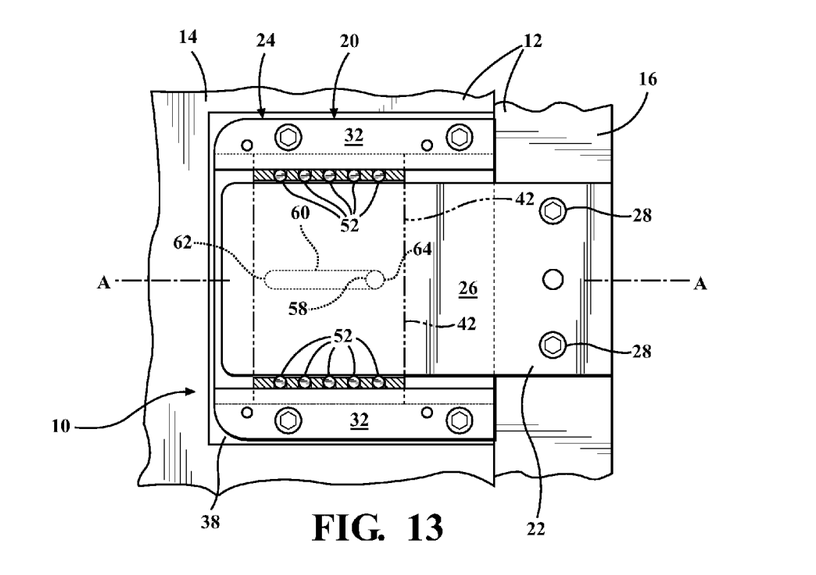
FIG. 13 is a side view of the positioning device and mold of FIG. 4 with the mold in a closed position.
Figure 14:
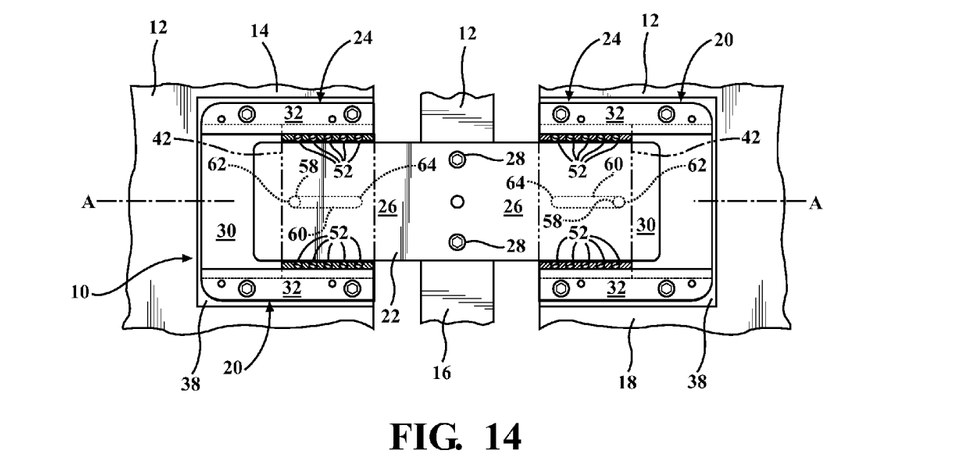
FIG. 14 is a side view of the positioning device and mold of FIG. 6 with the mold in the opened position.
Figure 15:
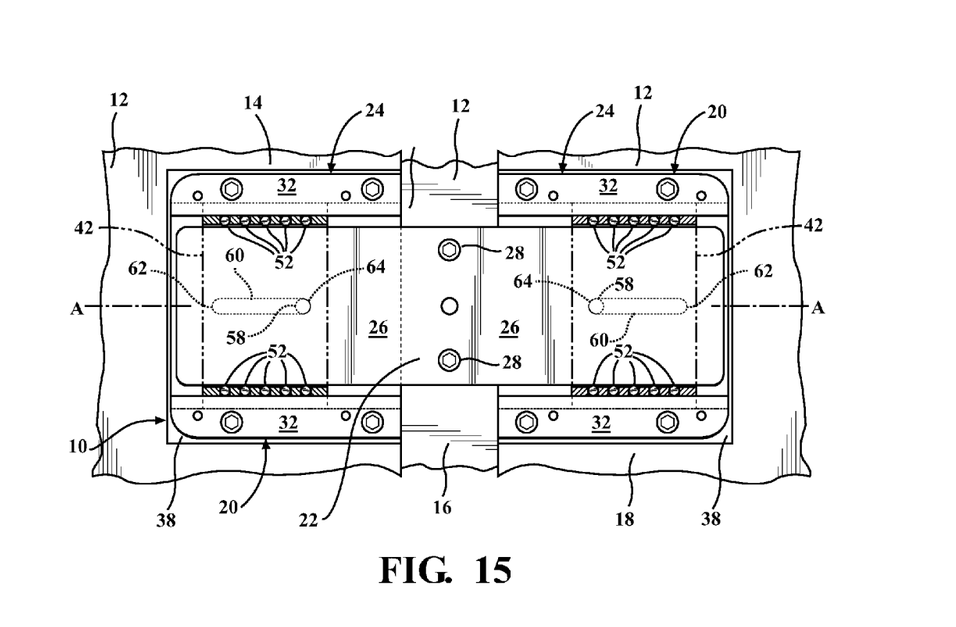
FIG. 15 is a side view of the positioning device and mold of FIG. 6 with the mold in a closed position.

The interaction between the post 58 and the groove 60 ensures proper alignment of the bearing mechanism 40 relative to the first member 20, e.g., the female member 24 in the Figures, as the first and second mold segments 14, 16 move between the opened and closed positions. The bearing mechanism 40 moves relative to the first member 20 along the alignment axis A between a first position, as shown in FIGS. 10, 12, and 14, and a second position, as shown in FIGS. 11, 13, and 15. The post 58 abuts the first end 62 of the groove 60 in the first position and abuts the second end 64 of the groove 60 in the second position. Such a design is capable of being operated without a spring for returning the bearing mechanism 40 to a proper position as the first and second mold segments 14, 16 move between the opened and closed positions.

As the first and second mold segments 14, 16 move to the closed position, the second member 22, e.g., the male member 26 in the Figures, moves the bearing mechanism 40 such that the first end 62 of the groove 60 and the post 58 move toward each other. Before, or as, the first and second mold segments 14, 16 reach the closed position, the post 58 and the first end 62 retain the bearing mechanism 40 in a proper position for the next mold operation, i.e., movement of the first and second mold segments 14, 16 toward the opened position. Specifically, as shown in FIGS. 11, 13, and 15, the post 58 abuts the first end 62 of the groove 60 to properly position the bearing mechanism 40 relative to the first member 20, e.g., the female member 24.

As the first and second mold segments 14, 16 move toward the opened position, the male member 26 moves the bearing mechanism 40 such that the second end 64 of the groove 60 and the post 58 move toward each other. The post 58 and the second end 64 prevent the bearing mechanism 40 from being completely removed from the female member 24. Before, or as, the first and second mold segments 14, 16 reach the opened position, the post 58 and the second end 64 retain the bearing mechanism 40 in a proper position for the next mold operation, i.e., movement of the first and second mold segment 14, 16 toward the closed position. Specifically, as shown in FIGS. 10, 12, and 14, the post 58 abuts the first end 62 of the groove 60 to properly position the bearing mechanism 40 relative to the first member 20, e.g., the female member 24.

With continued reference to FIGS. 10-15, in operation, when the mold 12 is moved between the opened and closed positions, the male member 26 typically remains engaged with the cage 42. Said differently, the male member 26 is continuously engaged with the cage 42 when the mold 12 is moved between the opened and closed positions. As set forth above, the first mold segment 14 and the second mold segment 16 move relative to each other along the alignment axis A as the mold 12 is moved between the opened and closed positions. Specifically, the male member 26 slides along the bearings 52 to move along the alignment axis A relative to the cage 42. As the male member 26 slides along the bearings 52, the cage 42 moves along the alignment axis A relative to the female member 24.

With continued reference to FIGS. 10-15, the cage 42 moves along the alignment axis A relative to the female member 24, the post 58 moves along the groove 60. As the cage 42 continues to move relative to the female member 24, the post 58 engages one of the ends 62, 64 of the groove 60 to prevent further movement of the cage 42 relative to the female member 24 to retain the cage 42 in the channel 34. Specifically, the as the mold 12 moves toward the opened position, the first mold segment 14 and the second mold segment 16 move away from each other and the post 58 slides in the groove 60 toward the first end 62 of the groove 60, as shown in FIGS. 10, 12, and 14. When the post 58 reaches the first end 62, the post 58 engages the first end 62 and prevents further movement of the cage 42 relative to the female member 24. As the mold 12 moves toward the closed position, the first mold segment 14 and the second mold segment 16 move toward each other and the post 58 slides in the groove 60 toward the second end 64. When the post 58 reaches the second end 64, the post 58 engages the second end 64 and prevents further movement of the cage 42 relative to the female member 24, as shown in FIGS. 11, 13, and 15.

In the first embodiment in FIGS. 1-3 and 10-11, the positioning device 10 aligns the first and second mold segment 14, 16 and a second positioning device 78 aligns the second and third mold segment 16, 18. Multiple pairs of the positioning device 10 and second positioning device 78 can be attached to the mold 12. The second positioning device 78 can be, for example, the positioning device disclosed in U.S. Pat. No. 6,953,331 or U.S. Pat. No. 7,828,542, both of which are incorporated herein by reference. The second positioning device 78 includes a female member 70 and a cage 72 moveably received by the female member 70 for movement relative to the female member 70 along the alignment axis A.

A second male member 68 is mounted to the second mold segment 16 and engages the cage 72 of the second positioning device 78. As shown in FIGS. 1-3 and 10-11, the male member 26 and the second male member 68 are integral with each other, i.e., are one piece before being attached to the second mold segment 16. The cage 72 of the second positioning device 78 rotatably supports a plurality of bearings 52, typically needle bearings, for slideably receiving the second male member 68 and slideably engaging the female member 70 as the cage 72 is moved between the opened and closed positions.

The second positioning device 78, for example, is spring-loaded, i.e., a spring (not shown) is disposed between the female member 70 and the cage 72 for biasing the cage 72 toward an extended position. When the mold 12 is moved to the closed position, the mold 12 overcomes the bias of the spring to move the cage 72 along the alignment axis A relative to the female member 66 to a retracted position.

In the second embodiment in FIGS. 4-5 and 12-13, the female member 24 is connected to the first mold 12 and the male member 26 is connected to the second mold 12. In the second embodiment, multiple positioning devices 110 can be connected to the mold 12.

In the third embodiment in FIGS. 6-7 and 14-15, the positioning device 210 includes two female members 24 and two cages 42 coupled to the two female members 24, respectively.

One of the female members 24 is mounted to the first mold segment 14 and the other female member 24 is mounted to the third mold segment 18. A second male member 26 is mounted to the second mold segment 16 and engages the cage 42 coupled to the female member 24 on the third mold segment 18. As shown in FIGS. 6-7 and 14-15, the male member 26 and the second male member 26 are integral with each other, i.e., are one piece before being attached to the second mold segment 16.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A positioning device for aligning first and second mold segments as the first and second mold segments move from an opened position to a closed position, said positioning device comprising:
   a female member for connecting to one of the first and second mold segments and for receiving a male member connected to the other of the first and second mold segments;
   a bearing mechanism coupled to said female member and configured to move relative to said female member along an alignment axis for receiving the male member and reducing friction between the male member and said female member;
   one of said female member and said bearing mechanism including a post extending transversely to said alignment axis and the other of said female member and said bearing mechanism defining a groove receiving said post as said bearing mechanism moves relative to said female member;
   said groove extending in parallel with said alignment axis and extending between and terminating at first and second ends spaced along said alignment axis for retaining said post between said first and second ends to retain said bearing mechanism in said female member when the first and second mold segments move between the opened and closed positions.

2. The positioning device as set forth in claim 1 wherein said bearing mechanism moves relative to said female member along said alignment axis between a first position and a second position and wherein said post abuts said first end in said first position and abuts said second end in said second position.

3. The positioning device as set forth in claim 1 wherein said bearing mechanism includes a cage and a plurality of bearings supported by said cage.

4. The positioning device as set forth in claim 3 wherein said cage defines said groove.

5. The positioning device as set forth in claim 1 wherein said female member includes a back and two sides spaced from each other and extending from said back defining a channel extending along said alignment axis that receives said bearing mechanism.

6. The positioning device as set forth in claim 5 wherein said post extends from said back.

7. The positioning device as set forth in claim 5 wherein one of said female member and said bearing mechanism defines a slot extending from said channel along said alignment axis and wherein the other of said female member and said bearing mechanism presents a wing that engages said slot.

8. The positioning device as set forth in claim 4 wherein said female member includes a back and two sides spaced from each other and extending from said back defining a channel extending along said alignment axis that receives said bearing mechanism.

9. The positioning device as set forth in claim 8 wherein said post extends from said back.

10. The positioning device as set forth in claim 8 wherein one of said female member and said bearing mechanism defines a slot extending from said channel along said alignment axis and wherein the other of said female member and said bearing mechanism presents a wing that engages said slot.

11. A positioning device for aligning first and second mold segments as the first and second mold segments move from an opened position to a closed position, said positioning device comprising:
    a first member for connecting to one of the first and second mold segments;
    a second member for connecting to the other of said first and second mold segments, said first member and said second member being configured to mate with each other and move relative to each other along an alignment axis;
    a bearing mechanism coupled to said first member for reducing friction when said first member and said second member move relative to each other;
    one of said first member and said bearing mechanism including a post extending transversely to the alignment axis and the other of said first member and said bearing mechanism defining a groove receiving said post as said bearing mechanism moves relative to said first member;
    said groove extending in parallel with said alignment axis and extending between and terminating at first and second ends spaced along said alignment axis for retaining said post between said first and second ends to retain said bearing mechanism in said first member when the first and second mold segments move between the opened and closed positions.

12. The positioning device as set forth in claim 11 wherein one of said first and second members includes a female member and the other of said first and second members includes a male portion received by said female member.

13. The positioning device as set forth in claim 11 wherein said bearing mechanism moves relative to said first member along said alignment axis between first position and a second position and wherein said post abuts said first end in said first position and abuts said second end in said second position.

14. The positioning device as set forth in claim 11 wherein said bearing mechanism includes a cage and a plurality of bearings supported by said cage.

15. The positioning device as set forth in claim 14 wherein said cage defines said groove.

16. The positioning device as set forth in claim 11 wherein said first member includes a back and two sides spaced from each other and extending from said back to define a channel extending along said alignment axis that receives said bearing mechanism.

17. The positioning device as set forth in claim 16 wherein said post extends from said back.

18. The positioning device as set forth in claim 16 wherein one of said first member and said bearing mechanism defines a slot extending from said channel along said alignment axis and wherein the other of said first member and said bearing mechanism presents a wing that engages said slot.

19. The positioning device as set forth in claim 15 wherein said first member includes a back and two sides spaced from each other and extending from said back defining a channel extending along said alignment axis that receives said bearing mechanism, said post extending from said back.

20. The positioning device as set forth in claim 19 wherein one of said first member and said bearing mechanism defines a slot extending from said channel along said alignment axis and wherein the other of said first member and said bearing mechanism presents a wing that engages said slot.

* * * * *